(No Model.) 5 Sheets—Sheet 1.

W. F. GREIMANN.
BAND CUTTER AND FEEDER.

No. 568,026. Patented Sept. 22, 1896.

Witnesses
J. W. Reynolds
Chas. S. Hyer

Inventor
William F. Greimann
By John W. Edderburn
Attorney

THE NORRIS PETERS CO., PHOTO-LITHO., WASHINGTON, D. C.

(No Model.) 5 Sheets—Sheet 2.

W. F. GREIMANN.
BAND CUTTER AND FEEDER.

No. 568,026. Patented Sept. 22, 1896.

Witnesses
J. M. Reynolds
Chas. S. Hyer

Inventor
William F. Greimann
By John Wedderburn
Attorney (No Model.)  5 Sheets—Sheet 3.
W. F. GREIMANN.
BAND CUTTER AND FEEDER.
No. 568,026.  Patented Sept. 22, 1896.
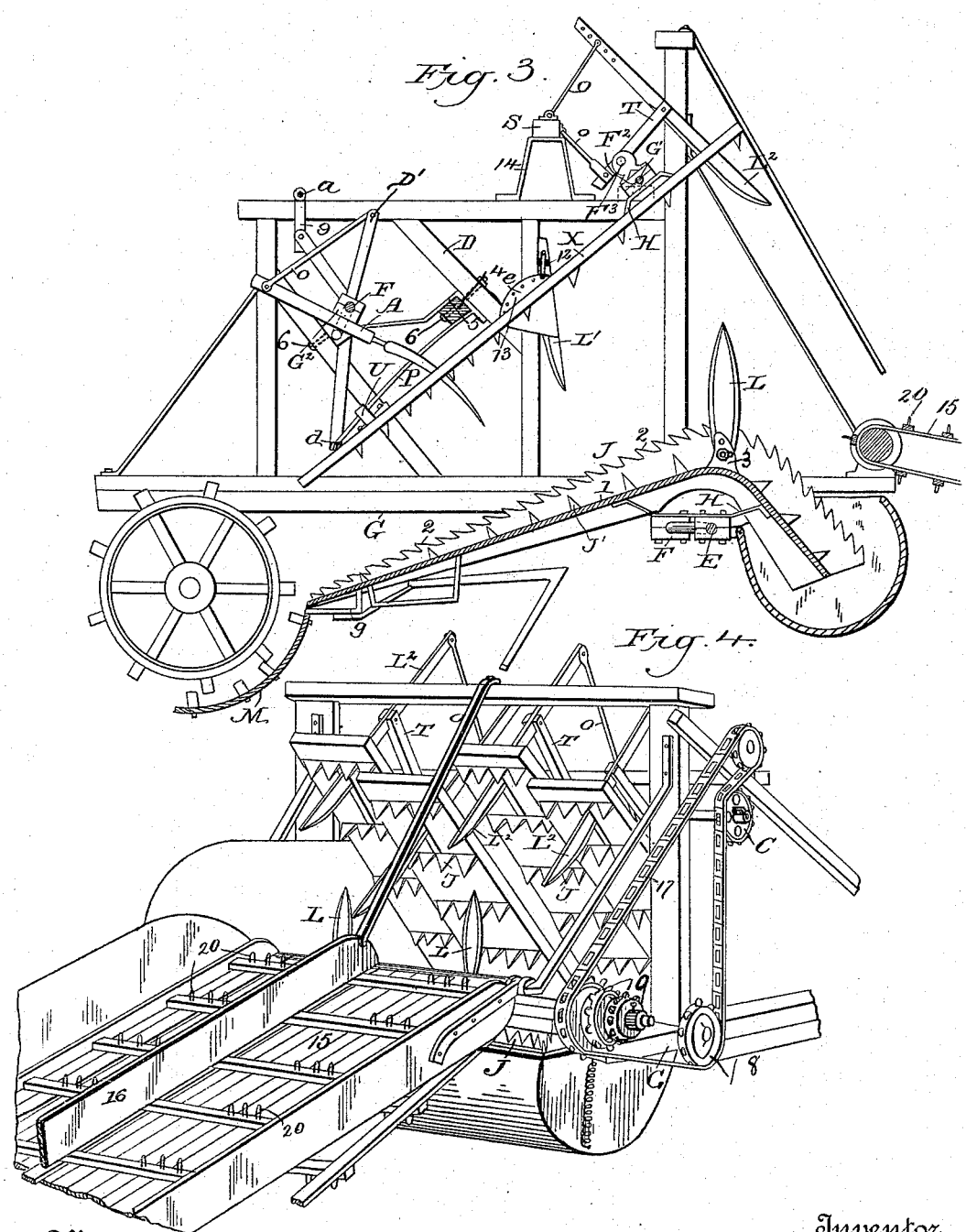

(No Model.) 5 Sheets—Sheet 4.

W. F. GREIMANN.
BAND CUTTER AND FEEDER.

No. 568,026. Patented Sept. 22, 1896.

Witnesses

Inventor
William F. Greimann
By John Wedderburn
Attorney (No Model.) 5 Sheets—Sheet 5.
W. F. GREIMANN.
BAND CUTTER AND FEEDER.
No. 568,026. Patented Sept. 22, 1896.
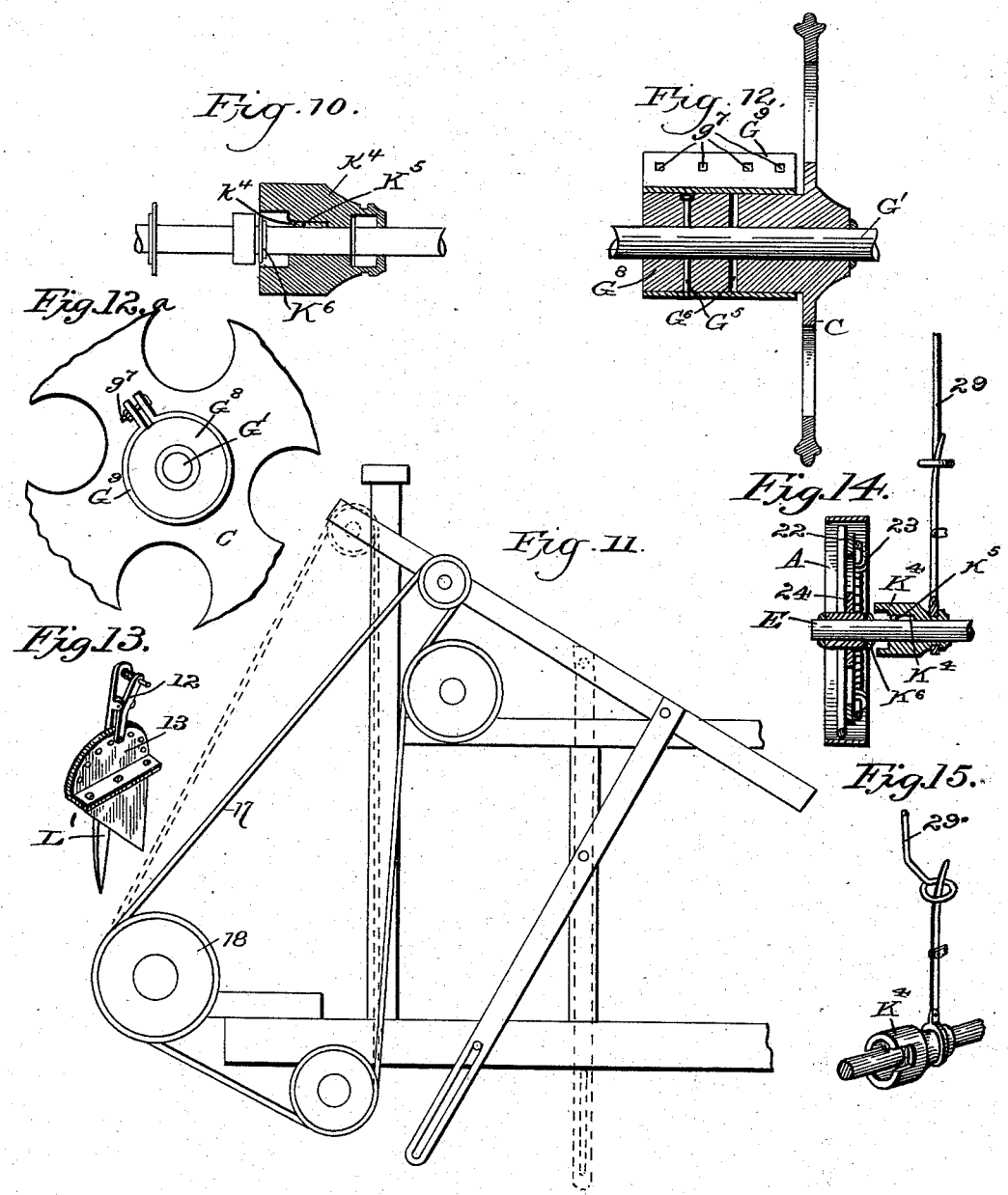

UNITED STATES PATENT OFFICE.

WILLIAM F. GREIMANN, OF GARNER, IOWA.

BAND-CUTTER AND FEEDER.

SPECIFICATION forming part of Letters Patent No. 568,026, dated September 22, 1896.

Application filed May 28, 1894. Serial No. 512,758. (No model.)

*To all whom it may concern:*

Be it known that I, WILLIAM F. GREIMANN, a citizen of the United States, residing at Garner, in the county of Hancock and State of Iowa, have invented certain new and useful Improvements in Band-Cutters and Feeders; and I do hereby declare the following to be a full, clear, and exact description of the invention, such as will enable others skilled in the art to which it appertains to make and use the same.

This invention relates to attachments to threshing-machines, in the nature of a band-cutter and feeder, whereby the grain is automatically fed to the threshing-cylinder, the band automatically cut by mechanical appliances, and the grain loosened and spread prior to its entrance into the threshing mechanism.

The primary object of the invention is to insure a positive and clean cut of the grain-bands, and a thorough spreading of the straw before entering the cylinder, whereby the threshing is effected in a rapid and efficient manner.

The improvement consists in the novel construction and combination of the parts, which will be hereinafter more fully described and claimed, and which are shown in the accompanying drawings, in which—

Figure 1:
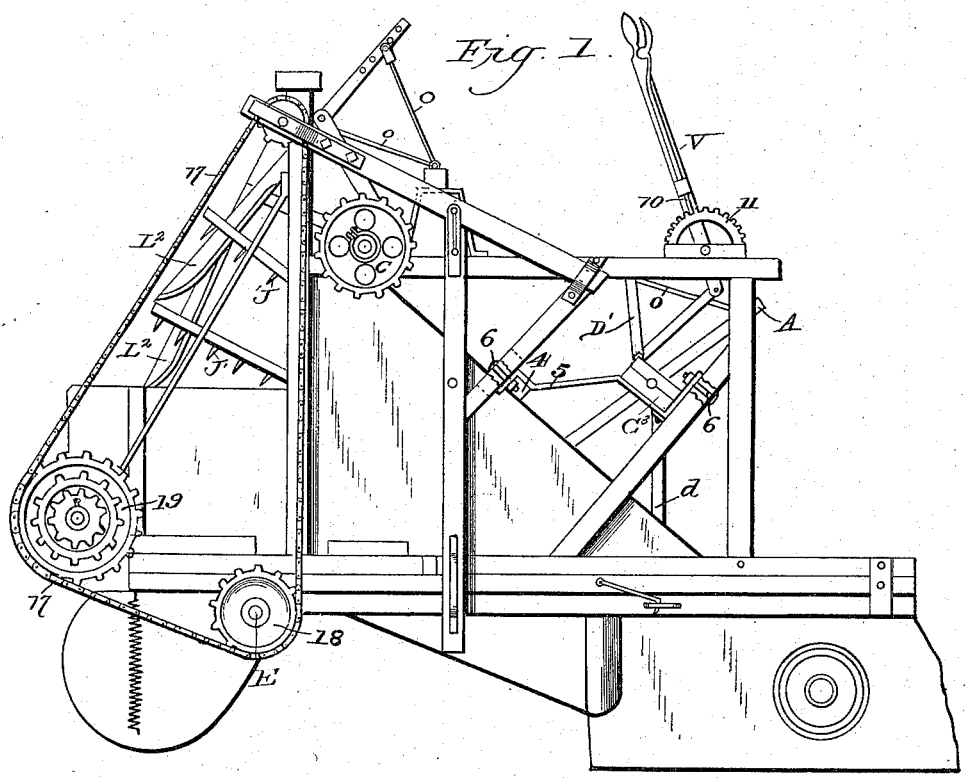
Figure 6:
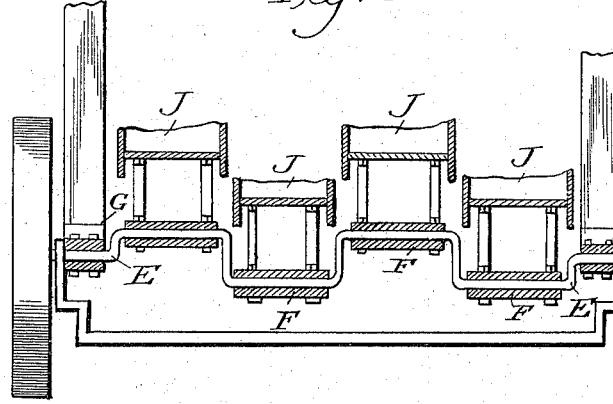
Figure 2:
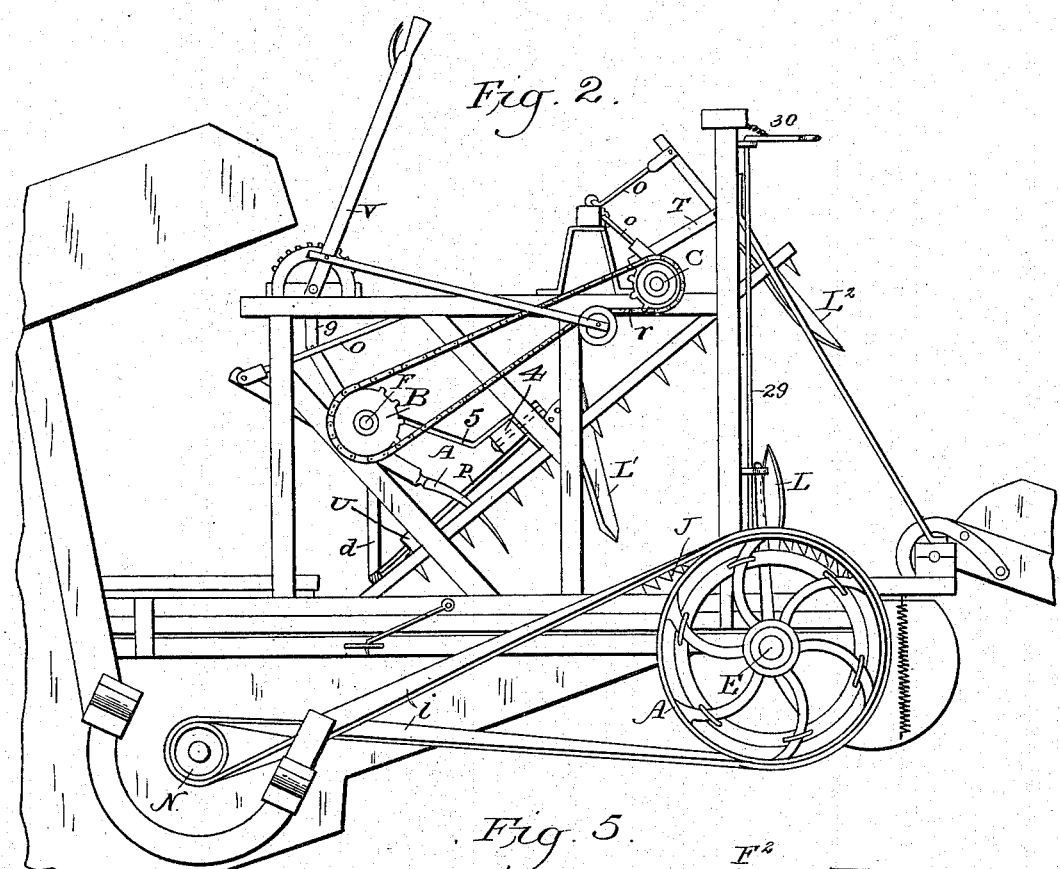
Figure 5:
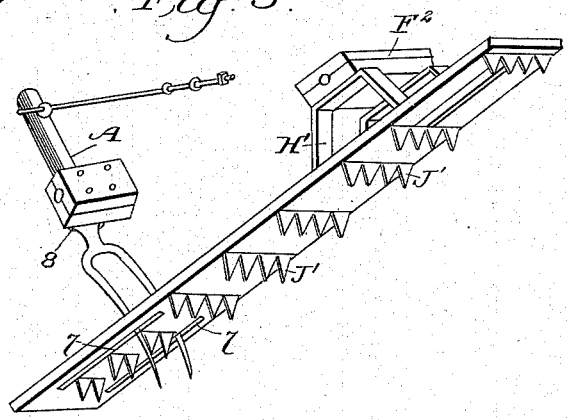
Figure 7:
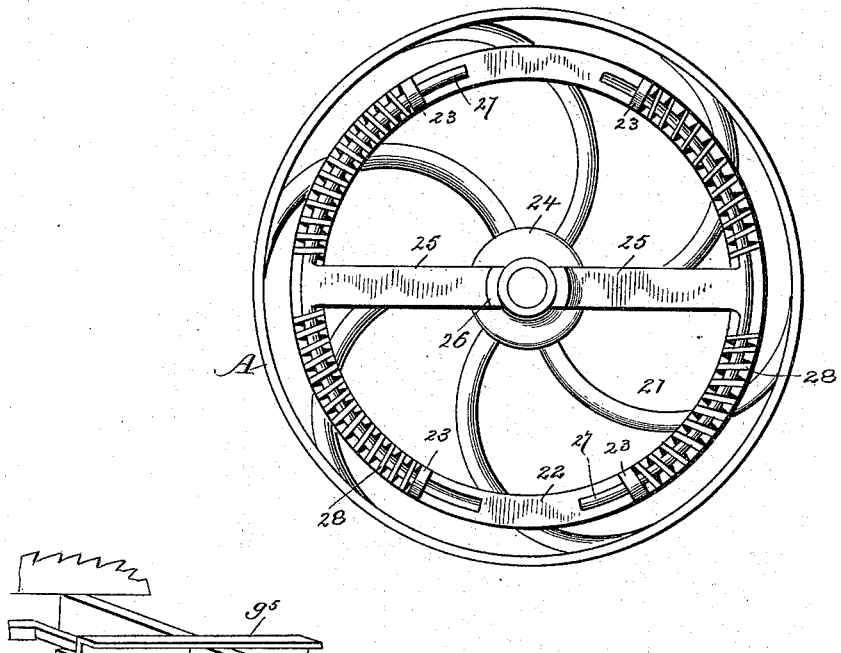
Figure 8:
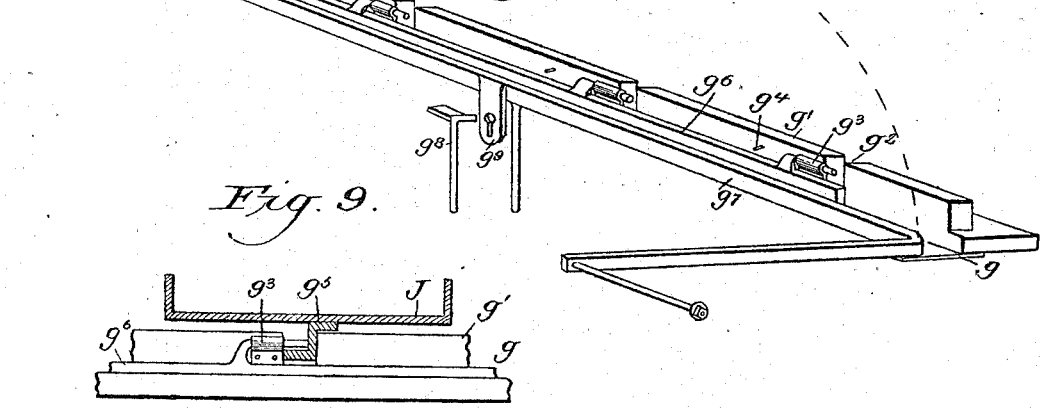
Figure 9:
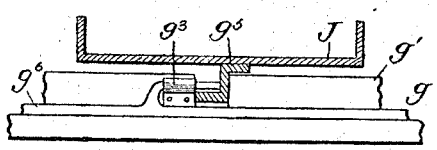

Figure 1 is a side elevation of a band-cutter and feeding attachment, showing its application to a threshing-machine of ordinary construction, the view being from the right-hand side. Fig. 2 is a view similar to Fig. 1 as seen from the opposite or left-hand side of the machine. Fig. 3 is a longitudinal section of the machine, showing clearly the relative position of the coöperating parts. Fig. 4 is a detail perspective view taken from the rear, showing the grain-feeding attachment. Fig. 5 is a detail perspective view of the upper sections and fork detached from the machine. Fig. 6 is a detail of the main crank-shaft and a cross-section of the lower feed-sections. Fig. 7 is a detail view of the drive-pulley and its spring clutch mechanism detached from the machine and shown on a larger scale. Fig. 8 is a perspective detail of the seat over the concave, showing the end of the lower section, its double flange, the slide-bar, its operating-arm, the yoke, the key for locking the yoke to the slide-bar, and the connections between the seat and slide-bar. Fig. 9 is a detail, partly in vertical section and partly in side elevation, showing the double flange in section. Fig. 10 is a sectional detail of the clutch on the main shaft out of gear. Fig. 11 is a detail in side elevation showing the means for putting in and out of gear the upper sections and forks. Fig. 12 is a sectional detail of the hub of the sprocket-wheel on the crank-shaft of the upper section with the friction relief-clutch. Fig. 12$^a$ is an end view of Fig. 12. Fig. 13 is a detail view of one of the band-cutting knives. Fig. 14 is a detail view of the clutch on the main shaft out of gear. Fig. 15 is a detail perspective view of the clutch.

Similar letters of reference refer to corresponding parts in the several views of the drawings.

The vibratory feed-board is divided into four sections J, each lower section being attached to a crank-shaft E by means of brackets H, bolted to the under side of the same, to which are bolted the crank-shaft boxes F of the sections. This crank-shaft E is underneath the lower sections and runs in boxes bolted to the under side of sills of the frame G. This shaft receives its motion by means of a cross-belt $i$, driven by a pulley N on the cylinder-shaft to a band or drive wheel A on this crank-shaft E.

The back part of each section next to the cylinder rests on a flange of a cast seat $g$, which is placed immediately over the concave M. This seat slides to position in the grooves on inside of cylinder-frame for concave and cast foot of feed-board. A groove is cut through the flange of the seat under each section. At each end and on the under side of this seat are fastened brackets, on which rests the cross-bar of the raising and lowering device for the lower sections. The cross-bar is bent at each end and forms a side bar, which is attached to a crank. By turning this crank back toward the cylinder it raises the ends of lower sections off the seat and affords easy access to the concaves. This raising and lowering device also holds the ends of the lower sections down on the seat. Upon reference to Fig. 8 this construction and arrangement of parts will be more readily understood. In this view the seat $g$ has the upwardly-extending flange $g'$, in which the slots $g^2$ are formed at the required intervals. $g^3$ are eye-seats which are secured on the seat and which receive the hook-bolts, which serve to keep the double flange in place in the slot of the seat-flange. This double flange $g^5$ is bolted to the under side of the lower section, as shown in Fig. 9. (It is shown as unbolted from the section in Fig. 8, but in its proper position.) There are one or more projections or pins $g^4$ projecting from the flange of the seat, as seen in Fig. 8, to limit the return movement of the slide-bar $g^6$, on which the hook-bolts are affixed. $g^7$ is the yoke in front of the slide-bar and on the end of the cross-bar. The dotted curved line in Fig. 8 shows the path taken by the end of the section when elevating the forward ends of the lower sections. $g^8$ is a key, which, when inserted through the opening in the depending lug $g^9$ on the yoke, locks the yoke to the slide-bar and thus to the seat $g$ and holds these three parts firmly.

As seen in Fig. 9, the double flange, which is bolted to the under side of the bottom of the lower section, during the vibratory movement of the section moves back and forth in the slot or groove in the flange of the seat $g$ and is held in place by the hook-bolt of the slide-bar.

Each lower section of the feed-board has serrated or saw-teeth sides 2. The bed 1 of the same has, at certain intervals, serrated conveyers $J'$, made of iron, which incline backward toward the cylinder and hold the straw and grain from returning with the forward stroke of the section and force it back toward the cylinder on the back stroke. At the summit of the curve of the bed of each lower section is bolted the seat 3 of each band-cutting knife L, one to each section. These band-cutting knives are pivoted to their respective seats, and are adjustable by means of a slot in each seat, so that the knives can be set at different angles to suit different threshers. These band-cutting knives L are double sickle-edged. On the forward edge the fine teeth are cut upward. On the back edge the teeth are cut downward. These band-cutting knives not only cut the bands, but spread the straw, and are designated as "band-cutting knives" and "spreaders." When the lower section has performed one complete movement by the revolution of the crank-shaft, i. e., has made one forward and back stroke, the point of the band-knife has described an ellipse. Hence in the mechanism of this device the motion imparted to the lower section at the forward end is elliptical. This elliptical motion imparted alternately to the forward ends of each lower section gives a backward rocking motion to the grain, which facilitates the spreading of the same by the band-knives. In the operation of this device, from the peculiar construction of the crank-shaft, each section alternately raises and lowers. The sides of each section do not quite reach the bottom of the adjoining higher section, and they run so close together that the four sections form a continuous floor or table, through which the grain cannot pass. The deflected end of each lower section is lower than that point in the bed where the band-knives are attached and projects under the end of the carrier 1, which delivers grain to the feeder. For the purpose of elevating the loose grain and straw at this point the deflected portion is provided with serrated cups, which are placed at intervals on the bed of the lower section, and grain and straw are conveyed up and backward toward the cylinder.

Above and corresponding to the lower sections are the upper sections X, four in number, which are attached to a crank-shaft $G'$, of the same form as the lower crank-shaft E. This shaft $G'$ is attached to the upper part of the frame and runs in boxes bolted to the same. Motion is conveyed to this shaft by means of a chain belt $r$, driven by a sprocket-wheel B, attached to the main crank-shaft F, to the sprocket C on this shaft. On the upper side of each of the upper sections is bolted a box or eye U, near the end next to the cylinder, through which passes a guide-rod P, which is attached to a cross-bar 4 near the center of the frame. This cross-bar is attached to an adjustable frame 5, which runs between the braces D of the frame of the machine. This frame is adjustable by means of bolts 6, which run in slots in each brace of the frame at this point. The ends of the guide-rods next to the cylinder are attached to a cross-bar $d$, which is bent upward at each end and bolted to the sliding frame.

In the end of each upper section next to the cylinder are two long slots 7, through which work the tines of the fork A. These forks A, working through each upper section, are attached to a crank-shaft F, of the same form as the crank-shafts of the upper and the lower sections, and receives its motion by means of a chain belt driven by a sprocket-wheel on the upper-section crank-shaft to a sprocket-wheel on this shaft of like dimensions. This gives exactly opposite motion to the upper sections and the tines of each fork, i. e., when the upper section is on the return stroke the fork is on the forward stroke. This crank-shaft runs in boxes $G^2$, attached to the sliding frame, and to each crank are attached boxes $G^3$, one for each fork, four in number. The handles to these forks are attached to each box on crank-shaft by means of clips 8, two to each fork, which renders the forks adjustable. To the upper end of each fork-handle is attached a rod O, which hooks in a cross-bar $D'$ near the top of the frame. This cross-bar $D'$ is bent downward at each end and is bolted to the box of the crank-shaft in the sliding frame. Just back of this cross-bar and next to the cylinder, attached at each end to the top of the frame, is a cross-bar $a$, to which are welded straps of iron 9, near each end and inside of the frame.

These descend and are bolted to the sides of the before-mentioned cross-bar. To one of these strips 9 is attached a lever V, with the usual spring-latch 10, operating on a notched segment 11. By moving this lever either forward or backward raises or lowers the frame 5, thus raising or lowering the forks and upper sections, because they are attached to the sliding frame. The rods attached to each fork-handle regulate its stroke and give the points of the tines an elliptical movement.

At proper intervals on the under surface of the upper sections are placed serrated conveyers J', same as the conveyers J in lower sections. The sides of these sections are serrated. Near the center of these sections on the under side are bolted seats e for adjustable sickle-edge knives or controllers L'. These knives have their cutting edge turned toward the grain as it enters the machine and, besides cutting bands which have passed the front knives, they serve to retard the flow of the straw until the forks back of them have entered it and pulled it forward and spread it for the cylinder. These knives are bolted to each seat near the lower point of the same and pass through a slot in each upper section, and are adjustable by means of a spring catch or bolt 12, attached to the upper part or handle of the knife. This catch or bolt, when the knife is moved forward or backward, slides along a perforated disk 13, attached to the upper side of the upper section. The perforations in this disk receive the bolt in the spring-catch and hold the knife in as many positions as there are perforations in the disk. By this device these knives can be set at any desirable angle.

Each upper section is attached to the crank-shaft by means of two brackets H', bolted to each section on the upper side. To these brackets are attached the crank-shaft boxes F², one for each section. In the center of the upper section and near the forward part of the same are long slots, one in each section, through which work the upper and forward band-cutting knives L². These knives L² are sickle-edged, facing the cylinder and receiving their motion by means of a walking-beam or knife-arm T, which runs in a box F³, attached to the upper side of each crank-shaft box F² of each upper section. To the forward and long end of the walking-beam is attached the band-knife. To the upper end of each band-knife is attached an adjustable stay-rod O', which is hooked into an eye-seat attached to a cross-bar S back of the knives and bolted to brackets 14, attached to the top part of the frame. To the lower and short end of each walking-beam or knife-arm are attached adjustable stay-rods o, hooked to an eye-seat on the front side of the cross-bar. By means of this device, when the crank-shaft to which it is attached makes one revolution, the points of these band-knives have described an ellipse. Hence their movement is elliptical and these knives not only cut the bands, but pull the straw back toward the cylinder.

To throw the upper sections and forks out of gear, a lever is placed on the side of the machine which is attached to a sliding bar near the top of the frame. On the upper end of this bar is placed an idler sprocket-wheel, over which the chain belt passes to the sprocket-wheel on the upper crank-shaft on this side of the machine. By moving this lever backward toward the cylinder it lifts the chain belt off the sprocket-wheel on the upper crank-shaft, thus throwing the upper sections and forks out of gear. Moving the lever forward it is received by the clutch on the sill of the frame which holds chain belt to sprocket and in gear. This clutch is adjustable.

On reference to Fig. 11 will be seen the means employed for putting in and out of gear the upper sections and forks. In this view, in full lines, the lever, the idler, and the chain belt are in position in gear, the idler-sprocket is thrown back, and the lower part of the lever is forward. In dotted lines the idler-pulley, belt chain, and lever are in the position they assume when out of gear, the idler is thrown forward, and the lever is thrown back.

Attached by hooks to the front part of the machine is the bundle-carrier 15, which receives the grain and conveys it to and delivers it into the lower sections or conveyers of the machine. In the center and lengthwise of the carrier and above the slats is placed the center board 16, which is held in position resting in a seat in the top of the frame of the feeder and by a pin in the lower end of the carrier-frame. The carrier receives its motion by means of a chain belt 17, driven by a sprocket-wheel 18 on the main shaft leading to a three-speed sprocket-wheel 19 on the pulley-shaft on the upper end of the carrier next to the machine. The hub of this three-speed sprocket has a set-screw, so that it can be shifted on the shaft to suit each set of cogs. The chain belt runs the carrier and upper device. Each slat in the carrier has inserted in each end three staple-teeth 20, which act as clutches in elevating bundles.

The drive-pulley A has attached to it a double spring-clutch on the inside of the pulley next to the frame of the machine. This clutch is attached to the pulley in this way: A circular band of iron 22 is securely attached with clips to the spokes of the pulley near the rim of the wheel. At certain distances eyes or seats 23 for springs are bolted to this circular band. The clutch is a shoulder of iron 26, welded to a heavy cross-bar 25, and to this cross-bar is welded a circular band or collar 24, of iron, which entirely surrounds and turns readily on the hub of the pulley. To the farther ends of this cross-bar is welded at its center a rod of iron 27, turned or bent in the form of an arc of a circle the same size as the circular band made fast to the pulley-spokes. These arc-rods have coil-springs 28 surrounding them and placed between the head of the cross-bar and the eye-seat on the circular band, four springs in number. The arc-rod passes through and projects beyond the eye of the eye-seat. The mechanism of this device is such that power can be supplied from the revolving wheel to the clutch on the shaft without shock.

In Fig. 10 I have shown a section of the clutch on the main shaft E. In this view it is shown out of gear. When in gear, it clutches the cross-bar transversely. The clutch $K^4$ is provided with slots $k^4$, in which runs a pin $k^5$, passed through the main shaft. There is also a pin through the main shaft at the opening of the jaws of the clutch and a washer $k^6$ next to the drive-pulley, which serves to prevent the pulley from following the clutch when putting out of gear. The jaws of the clutch when geared clutch the cross-bar of the pulley, the arc-springs receiving the shock, and when the pulley is in motion act as a cushion when moving either forward or backward. This pulley is loose on its shaft and not keyed thereon.

To throw the drive-pulley in and out of gear, a perpendicular rod 29, passing through eyes attached to the corner-post of frame, is placed. The upper end of this rod has an elbow 30 attached, making two arms, which turn horizontally. To the right arm of the shank is attached a coil-spring fastened to the back part of the post. This spring holds the clutch in gear. A cord runs from the right arm of the shank to the engine. Also a cord runs from the opposite arm back to the separator. The lower end of the rod has a shank-eye which turns horizontally. Through this eye runs the end of the lever to the clutch. This lever is attached to the sill of the frame. Pulling the cord either at the engine or separator throws the shaft-clutch back toward the machine and stops the motion of the feeder. The shaft-clutch has a slot in the hub, in which runs a pin through the main shaft. To the lower part of the front posts of feeder is bolted an iron yoke, which passes down on the outside of the sill and under the bracket of the separator and across and under the front part of the feeder. This yoke holds the sills from spreading.

The sills of the feeder are attached to the brackets of the separator next to the cylinder by an iron clasp attached to the sill and clasps under the girder of the bracket. Also on the side of the sill a hook is attached, which enters a staple on the outside of the girder of the bracket. Attached to the lower part of the boxes of the crank-shaft of the lower sections is a rod crosswise of the feeder and under the lower sections. To this rod is attached a sheet-iron pan or trough, which curves down and under the lower ends of the lower sections, then up and over the same, thus forming a pan or trough closed at the ends. The bottom of each lower section runs close enough to the curved bottom of this pan to scoop up and elevate the loose grains and scatterings at this point and pass them on to the cylinder. The ends of this sheet-iron pan are attached to and rest on coil-springs attached to the under side of the sills of the feeder, thus allowing the pan to descend when the back ends of the lower sections are raised.

In Fig. 12 I have shown what I term a "relief-clutch." $G'$ is the upper-section crank-shaft, and C the sprocket-wheel thereon. $G^5$ is a pin through the shaft, and $G^6$ is a washer inside of the same. $G^7$ is the outer half of the hub, which is bolted to the shaft $G^8$ on the inside half of the hub, around which is clamped by a plurality of bolts $g^7$ the metallic band $G^9$, which clutches by compression both the outer and inner halves of the hub of the sprocket. The object of this clutch is as follows: When the bundles of grain are fed so rapidly as to tend to run down the motion of the separator, by this device the upper-crank-shaft sprocket will slip and allow the lower sections to dispose of and run through the abnormal feed of bundles, and when reduced to normal speed and proper tension allows free motion of the upper section at once.

Having thus described the invention, what is claimed as new is—

1. The combination with an upper feeder composed of a series of independent sections arranged side by side, a crank-shaft carrying said sections, band-cutters, a walking-beam to which said cutters are pivotally attached, rods adjustably connecting the upper ends of the band-cutters and the inner ends of the walking-beam with a fixed portion of the frame, a sliding frame adapted to support the inner ends of said feeder-sections, and forks carried by a crank-shaft journaled in said sliding frame, substantially as set forth.

2. The combination with the upper section having longitudinal slots, of a walking-beam, knives working through the slots of the upper section and deriving their motion from the walking-beam, and the band-knife attached to the forward end of said walking-beam, means for driving the upper section at one end and supporting it in reciprocation at the other and means for driving the walking-beam substantially as set forth.

3. The combination with the upper section having longitudinal slots, of a walking-beam, knives working through the slots of the upper section and deriving their motion from the walking-beam and the band-knife attached to the forward end of said walking-beam, and an adjustable stay-rod attached to the upper end of the band-knife, means for supporting the upper section at one end in its reciprocation and means for driving the walking-beam and means for driving the upper sections at one end substantially as set forth.

4. The combination with the upper section having longitudinal slots, of a walking-beam, knives working through the slots of the upper section and deriving their motion from the walking-beam and the band-knife combined with a band-cutter attached to the forward end of said walking-beam, an adjustable stay-rod attached to the upper end of the band-knife, a cross-bar to which said stay-rod is connected, means for driving the walking-beam and adjustable stay-rods connected to the lower end of the walking-beam and to the front side of the cross-bar, substantially as set forth.

5. The combination with the upper sections provided with cups or conveyers and the adjustable sickle-knives secured near the center of said sections, of the lower section having serrated sides and the bed provided with cups or conveyers, and means for supporting and reciprocating the upper and lower sections, substantially as set forth.

6. The combination with the upper sections provided with cups or conveyers and the adjustable sickle-knives secured near the center of said sections, of the lower sections having serrated sides and the bed provided with cups or conveyers inclining backward toward the cylinder and serrated, and means for supporting and reciprocating the upper and lower sections substantially as set forth.

7. The combination with an upper feeder, a means for imparting a vibratory and reciprocatory movement thereto, of a fork adapted to have its prongs working beyond the active face of the said feeder, a means for imparting an oscillatory and elliptical movement thereto in an opposite direction to the movement of the said feeder, substantially as specified.

8. In combination, an upper feeder composed of a series of independent sections arranged side by side, a crank-shaft having the said sections mounted on the crank portions thereof, seats $F^3$ attached to the boxes mounted on the said crank portions, walking-beams mounted in the said seats, band-cutters pivotally attached to the outer ends of the walking-beam, rods adjustably connecting the upper ends of the band-cutters and the inner ends of the walking-beams with a fixed portion of the frame, a sliding frame 5, provided with guide-rods to support the inner ends of the feeder-section, a crank-shaft journaled in the sliding frame, and forks on the crank portions of the said crank-shaft, substantially as described for the purpose set forth.

9. The combination with the upper and lower sections, of a pan or trough under the deflected part of the lower sections to receive and facilitate elevation of loose grain to the bed of the upper sections, substantially as specified.

In testimony whereof I have signed this specification in the presence of two subscribing witnesses.

WILLIAM F. GREIMANN.

Witnesses:
G. E. WHIPP,
ALBERT HOWE.